Oct. 28, 1952
M. M. CUNNINGHAM
2,615,487
LAP SEAM FOR COATED CORD FABRIC
AND METHOD OF MAKING SAME
Filed Oct. 20, 1949
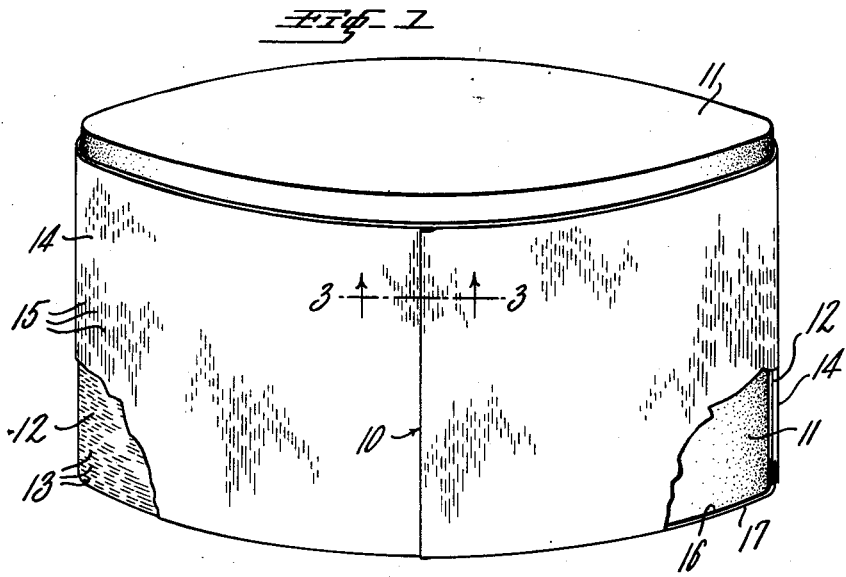
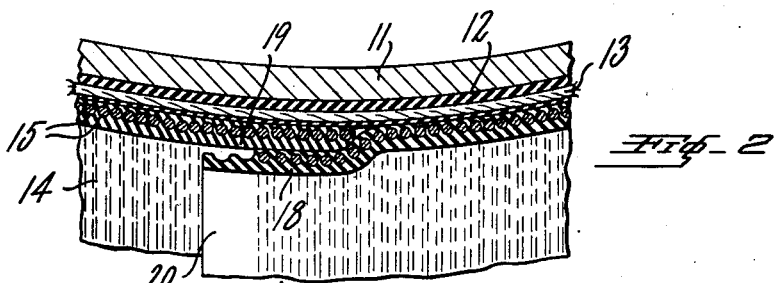
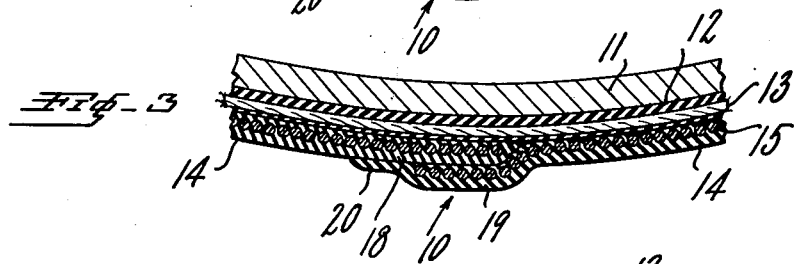
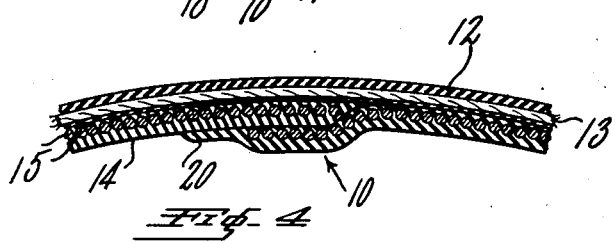
INVENTOR.
MARION M. CUNNINGHAM
BY
Charles B. Willson
ATTORNEY

UNITED STATES PATENT OFFICE 2,615,487

LAP SEAM FOR COATED CORD FABRIC AND METHOD OF MAKING SAME

Marion M. Cunningham, Woonsocket, R. I., assignor to United States Rubber Company, New York, N. Y., a corporation of New Jersey Application October 20, 1949, Serial No. 122,460

2 Claims. (Cl. 150—0.5)

This invention relates to an improved non-wicking lap seam for coated cord fabric and a method of forming the same.

It has been the practice heretofore to manufacture liquid containers for fuel, water, chemicals, etc., from multi-ply layers of cord fabric coated with rubber, synthetic rubber or other suitable plastic composition resistant to the contents of the container. The inner liner ply of these containers must be entirely leakproof. The sheets of cord fabric forming a container or at least the cord fabric sheet used to form the inner liner of the container is preferably provided with lap seams because of the added strength, but such lap seams have an edge exposed to the contents of the container. This exposed edge frequently permits the container contents to reach the reinforcing cords of the fabric, with the result that such cords absorb the liquid of the containers, and by wicking action transfer the liquid through the fabric. Saturation of the cord fabric in this way causes an increase in the weight of the container, and in some cases is responsible for the delamination of the fabric plies forming the inner container wall.

To prevent the confined liquid from coming in contact with the exposed reinforcing cords along the edge of the seam, it has been customary heretofore to seal over this fabric seam, which extends parallel to the cords, by covering it with a strip of gum tape made from the same material as the coating composition of the cord fabric. This tape is bonded to the exposed surface of the cord fabric at each side of the over-lapped seam, but it is found difficult to bond this tape so firmly in place that no leakage will occur which will allow the liquid to contact one or more cords of the cord fabric.

The present invention obviates the use of such gum strips over these lap seams and provides a simple construction for forming a liquid tight seam. In carrying out the present invention two marginal portions of the cord fabric are overlapped, but before these overlapped portions are bonded together, one or more cords is stripped from the outer marginal sheet to leave a lip of rubber or other coating material projecting beyond the last cord, so that this lip may be sealed firmly to the under sheet of the lap seam to thereby seal off the cords from the container liquid and form a leakproof lap seam.

In making a non-metallic tank or container of cord fabric it is customary to build up such a container of successive plies of the cord fabric lying one over the other but with the cords of one layer disposed at a pronounced angle to the cords of the next layer, to thereby form a strong container wall which is subsequently cured or vulcanized if the cord fabric is formed of vulcanizable coating material, so as to bond the plies together. Cord fabric such as herein contemplated has strength in only one direction, the filler strands when used are extremely weak and are incorporated only to facilitate handling the cords during processing. Such cord fabric obviously cannot be used in a single ply form because it possesses strength in only one direction, and at least two plies should be used with the cords of one ply extending at a pronounced angle to the cords of the adjacent plies. To compensate for the uni-directional strength, it is the general practice to build up and bond together successive layers in angular relation, and the laminated wall thus produced has strength in all directions.

The lap seam of the present invention is designed more especially for use on the inner ply of such a laminated container wall, because only the inner ply comes in contact with the contents of the container and is required to be leak-proof, but such lap seam may be used for other plies.

The details of the present invention will be further understood by referring to the accompanying drawing, in which:

Fig. 1 is a perspective view of a coated cord fabric tank shown built upon a supporting form;

Fig. 2, on a larger scale, is a sectional perspective view showing an intermediate step in forming the lap seam of the tank of Fig. 1;

Fig. 3 is an enlarged sectional view taken on the line 3—3 of Fig. 1; and

Fig. 4 is a view similar to Fig. 3 showing the appearance of the seam after the tank has been removed from the form and turned to place the lining at the inner face of the tank.

Fig. 1 shows a flexible tank or container which is or may be of conventional construction, except for the lapped seam 10. This tank is shown as built up upon a form 11 made of any relatively rigid material that will support the plies of coated cord fabric that are laid thereupon in building the container. This container is shown as formed of one ply 12 of cord fabric having the cords 13 extending horizontally or circumferentially about the form 11, and a second ply 14 having the cords 15 extending vertically or axially of the form. The bottom of this tank is shown as formed of the ply sheets 16 and 17 and the outer marginal portions of these sheets 16 and 17 overlap and are bonded to the lower end portions of the side wall plies 12 and 14.

The tank shown in Fig. 1 is built inside out upon the form 11, as this gives the tank the desired shape and also gives the workmen building the tank a better opportunity firmly to seal the fabric joints at the surface of the tank which will later contact the confined liquid, when the tank is in use. The tank shown in Fig. 1, it is assumed, has been completed and vulcanized on the form 11, all that remains is to remove it from this form and turn it inside out, so that the lapped seam 10 which appears at the outer face of the tank in Figs. 1, 2 and 3 will appear at the inner face of the tank, as shown in Fig. 4, when the form 11 has been removed and the tank is turned inside out.

Now referring more particularly to Fig. 2 of the drawing, the curved side wall of the form is indicated by the numeral 11, and in direct contact with the outer curved surface of this wall 11 lies the cord fabric 12 having the horizontally extending cords 13. Over the cord fabric 12 is provided the second cord fabric 14 having the vertically extending cords 15. Both cord fabrics 12 and 14 may be of similar construction and each is formed of parallel textile cords that are embedded in a sheet of rubber, rubber-like material, or plastic material, and it should be noted that the rubber-like material in each of the cord fabrics 12 and 14 is thicker at one face of the cords than at the other. This is desirable in respect to the cord fabric 14, which is to form the inner lining when the tank is finished, so as to provide a relatively thick layer of rubber between the contents of the tank and the cords 15. Such a construction is also desirable for the outer cord fabric 12 in the finished tank so that the thick rubber film at the outer face of the tank will protect the cords 13 from injury.

In building the tank or container shown in Fig. 1 of the drawing unvulcanized cord fabric, such as tire cord fabric may be used, and the first cord fabric ply is laid upon the form 11, as above stated, with the cords extending horizontally in the construction shown. The second ply is then laid over the first in the construction shown so that the cords 15 extend vertically, and the lapped seam 10 is formed by laying the outer marginal portion 18 of this cord fabric 14 over the inner marginal portion 19 as best shown in Fig. 2. Then, in accordance with the present invention, one, two or more cords 15 are removed adjacent the outer edge of this marginal portion 18 to leave a cord free lip 20 as shown in Fig. 2. Next this overlapping portion 18 is rolled or pressed down into firm engagement with the face of the portion 19 it overlaps, so that the lip 20 will be firmly bonded to the underlying surface as shown in Fig. 3 and prevents the liquid which will later contact the inner wall of the tank from entering this seam or reaching the cords 15 and cause wicking.

After the lap seam 10 has been formed as above described and as shown in Fig. 3, and the tank has been vulcanized on the form 11, all that remains is to remove this tank from the form 11 and turn the tank inside out so that the liquid tight lap seam 10 which is shown at the outer face of the tank in Fig. 1 will now lie at the inner face of the tank as shown in Fig. 4.

The lap seam formed in accordance with the present invention is strong, tight and easy to make and it is far more secure against leaks than are the cord fabric lap seams employed heretofore in the construction of flexible tanks and containers.

This invention may be used advantageously where the cords are coated with natural rubber or other materials such as Buna N. Such Buna N coated cords are employed where the container is required to hold gasoline, xylene, benzine, etc. For other applications it may be desirable to use GR-S or Neoprene or certain resin coated compositions, like polyvinyl chloride. If the coating is lacking in raw tack, it is necessary to use a suitable adhesive to join the overlapping edges of the coated cord.

Although the invention has been above described in connection with liquid containers, it may well be used in other applications where it is desired to join the overlapping marginal portions of coated cord fabric to form a liquid tight lap seam.

Having thus described my invention, what I claim and desire to protect by Letters Patent is:

1. A flexible liquid tight container made of coated cord fabric, and having a coated cord fabric lining provided with a leak-proof lap seam extending parallel to the cords of the lining, said seam being formed of two overlapping marginal portions of the lining so that one covers the other at the inner face of the container, the covering marginal portion adjacent its edge having a thin integral lip of the coating that is free of cord and said lip being bonded to the underlying layer of cord fabric so as to form a tight seal over any cord at the base of such lip.

2. In the manufacture of non-metallic liquid containers, the method of joining two marginal wall portions of coated cord fabric so as to form a tight lap seam at the inner wall of the container and extending parallel to the cords of the fabric, which comprises overlapping two marginal portions of the coated cord fabric so that one marginal portion covers the other at the inner wall of the container, removing at least one cord from the covering marginal portion adjacent its edge so as to leave a thin cord-free lip of the coating at this edge, and bonding this cord-free lip to the underlying layer of cord fabric so as to form a tight seal over any cord at the base of such lip.

MARION M. CUNNINGHAM.

REFERENCES CITED

The following references are of record in the file of this patent:

UNITED STATES PATENTS

| Number | Name | Date |
| --- | --- | --- |
| 1,261,118 | Geisel | Apr. 2, 1918 |
| 2,016,851 | Brady | Oct. 8, 1935 |
| 2,022,501 | Cramer | Nov. 26, 1935 |
| 2,061,375 | Cramer | Nov. 17, 1936 |
| 2,098,258 | Rowe | Nov. 9, 1937 |
| 2,106,875 | Rowe | Feb. 1, 1938 |
| 2,182,169 | Bierer | Dec. 5, 1939 |
| 2,401,625 | Eger | June 4, 1946 |
| 2,404,766 | Hanson et al. | July 23, 1946 |
| 2,439,562 | Cunningham | Apr. 13, 1948 |
| 2,476,325 | Rowe | July 19, 1949 |